2,921,046

PROCESS FOR PREPARING STABLE VINYL CHLORIDE POLYMERS

Evert Johannes Arlman, Amsterdam, Netherlands, assignor to Shell Development Company, Emeryville, Calif., a corporation of Delaware No Drawing. Application September 28, 1953
Serial No. 382,840

Claims priority, application Netherlands October 20, 1952

5 Claims. (Cl. 260—45.7)

This invention relates to a new method for preparing stable polymers of vinyl chloride. More particularly, the invention relates to a new method for preparing polymers of vinyl chloride which have improved resistance to decomposition by heat and light.

Specifically, the invention provides a new and highly efficient method for preparing heat and light stable polymers of vinyl chloride which comprises polymerizing the vinyl chloride or monomer mixture containing the vinyl chloride in the presence of a compound which is free of aliphatic carbon-to-carbon unsaturation and is selected from the group of compounds having an aliphatic carbon atom attached to from one to two hydrogen atoms and attached through at least one other free valence bond to an aromatic radical, and/or to the carbon atom of a hydrogenated aromatic radical, and compounds having an aliphatic carbon atom attached to at least one chlorine atom and attached through at least one other free valence bond to an aromatic radical and/or to the carbon atom of a hydrogenated aromatic radical.

It is known that polymers and copolymers of vinyl chloride tend to decompose to some extent on being exposed to relatively high temperatures and/or light with a resulting discoloration of the polymer. Attempts have been made to correct this by adding various additives, such as various metallic salts, to the vinyl chloride polymers after they have been prepared from the basic monomers. While this method has been effective in imparting some stability to the polymers, it is not entirely satisfactory for large-scale commercial applications. With these methods, for example, it is difficult to obtain a thorough mixing of the additive with the polymer, and in many cases the presence of the additive has a deleterious effect on the properties of the finished polymer. In addition, the action of the additive is in most cases only temporary and after a prolonged period of exposure the polymer again becomes discolored.

It is, therefore, an object of the invention to provide a new method for preparing stable polymers of vinyl chloride. It is a further object to provide a new and highly efficient method for preparing vinyl chloride polymers that have excellent resistance to decomposition by heat and light. It is a further object to provide a method for preparing heat and light stable polymers of vinyl chloride without having to add stabilizing additives to the finished polymer. It is still a further object to provide a method for preparing heat and light stable vinyl chloride polymers that still retain all of their desired physical properties such as good electrical properties, etc. It is a further object to provide a method for preparing vinyl chloride polymers that retain their stability over unusually long periods of time. Other objects and advantages of the invention will be apparent from the following detailed description thereof.

It has now been discovered that these and other objects may be accomplished by the novel process of the invention which comprises polymerizing the vinyl chloride monomer or monomer mixture containing the vinyl chloride in the presence of certain minor amounts of a compound which is free of aliphatic carbon-to-carbon unsaturation and is selected from the group of compounds having an aliphatic carbon atom attached to from one to two hydrogen atoms and attached through at least one other free valence bond to an aromatic radical and/or to the carbon atom of a hydrogenated aromatic radical, and compounds having an aliphatic carbon atom attached to at least one chlorine atom and attached through at least one other free valence bond to an aromatic radical and/or to the carbon atom of a hydrogenated aromatic radical. It has been found that vinyl chloride polymers prepared in this manner exhibit outstanding resistance to heat and light and can be exposed thereto for long periods of time without undergoing substantial decomposition and discoloration. While the mechanism of the stabilizing action in this process is not thoroughly understood, it is believed that the decomposition of the vinyl halide polymers involves the end groups of the polymers and that when the polymerization is conducted in the presence of minor amounts of the above-noted special type of materials, the end groups of the polymers are varied so as to give polymers having excellent resistance to heat and light.

The above process is of particular advantage over the known methods of stabilizing the vinyl chloride polymers as it eliminates the necessity of adding additives after the polymer has been formed, eliminates the problem of thoroughly mixing the additive with the polymer, eliminates any danger of affecting the desired physical properties of the polymer, and yields products having prolonged resistance rather than just temporary resistance to decomposition.

The materials to be used in the polymerization reaction mixture to stabilize the vinyl chloride polymers comprise those compounds which are free of aliphatic carbon-to-carbon unsaturation and are members of the group of compounds which possess an aliphatic carbon atom which is joined to from one to two hydrogen atoms and attached through at least one other free valence bond to an aromatic radical and/or to the carbon atom of a hydrogenated aromatic radical, and compounds which possess an aliphatic carbon atom which is joined to at least one chlorine atom and attached through at least one other free valence bond to an aromatic radical. The term "aliphatic" as used herein in the appended claims in reference to the carbon joined to the hydrogen (or chlorine) and to the carbon atom of the aromatic radical or hydrogenated aromatic radical is meant to include cycloaliphatic carbon atoms as well as the open-chain aliphatic carbon atoms. The expression "aromatic radical" refers to monovalent aromatic radicals wherein the free valence is attached to a carbon atom in an aromatic ring. The expression "hydrogenated" as used herein in reference to the aromatic radicals refers to partial hydrogenation as well as complete hydrogenation of the aromatic rings in the said aromatic groups. For brevity, these compounds will be referred to herein and in the appended claims as "stabilizing compounds."

Examples of these stabilizing compounds include, among others, cymene, cumene, phenyl-2-butane, phenyl-2-hexane, phenyl-2-cyclohexane, triphenylmethane, diphenylmethane, dihydro-anthracene, fluorene, benzyl chloride, (dichloromethyl)benzene, (trichloromethyl)-benzene, hydrogenated naphthalenes, isopropylcyclohexane, isobutylcyclohexane, dichloromethylcyclohexanes and isopropyl-4-cyclohexane.

Preferred compounds to be used as the stabilizing compound are (1) those compounds having a tertiary aliphatic carbon atom substituted with a hydrogen atom and at least one aromatic radical, such as cumene, cymene, phenyl-2-butane and triphenylmethane, (2) compounds having a non-substituted methylene group linked to two aromatic radicals, such as diphenylmethane, dihydro-anthracene, and fluorene, (3) compounds derived from alkyl-substituted benzenes, as toluene, by substituting a hydrogen atom on the aliphatic carbon atom joined to the benzene ring with from 1 to 3 chlorine atoms, such as benzyl chloride (dichloromethyl)-benzene and (trichloromethyl)benzene, and (4) hydrogenated products of naphthalene.

Particularly preferred compounds to be used as the stabilizing component are the hydrocarbons possessing an aliphatic carbon atom which is joined to from 1 to 2 hydrogen atoms and from 1 to 2 aromatic hydrocarbon radicals or from 1 to 2 hydrogenated aromatic hydrocarbon radicals, and hydrocarbons possessing an aliphatic carbon atom which is joined to from 1 to 3 chlorine atoms and from 1 to 2 aromatic hydrocarbon radicals or from 1 to 2 hydrogenated aromatic hydrocarbon radicals.

Coming under special consideration, particularly because of the fine properties of the polymers obtained by their use, are the stabilizing compounds of the general formula

wherein C is an aliphatic carbon atom, A is chlorine or hydrogen, Y is chlorine or a hydrocarbon radical and X is an aromatic or hydrogenated aromatic radical.

The above-described stabilizing compounds are added to the mixture to be subjected to the polymerizing conditions in minor amounts varying from about .001 to about 8 mol per 100 mol of monomer. The highest degree of stability is generally obtained when the compounds are employed in amounts varying from .005 to 5 mol per 100 mol of monomer and these are the preferred amounts to be employed. With the more active stabilizing compounds, however, amounts varying from about .001 to .005 mol per 100 mol of monomer may be effective and with the less active stabilizing compounds, amounts varying from 5 mol to 8 mol per 100 mol of monomer may be needed.

The polymerization and copolymerization of the vinyl chloride according to the present invention may be effected by any of the known methods. The polymerization may be effected, for example, in bulk systems, in solvent solution or in an aqueous emulsion or suspension. The polymerization may also take place under the influence of an increased temperature alone or with polymerization catalysts and/or with chemically active radiation. All free radical type polymerization catalysts and initiators may be used in the polymerization, such as, for example, the peroxide catalysts as benzoyl peroxide, potassium persulfate, potassium perborate, tertiary butyl perbenzoate, tertiary butyl peracetate, diacetyl peroxide, lauroyl peroxide, cumene hydroperoxide, tertiary butyl hydroperoxide, hydrogen peroxide, potassium percarbonate, and the like, and azo catalysts, such as alpha,alpha-azobisisobutyronitrile, dimethyl azobisisobutyrate and p-methoxybenzene diazo thio-2-naphthylether. The azo compounds in which the azo group is linked by both valencies to aliphatic carbon atoms, and preferably tertiary aliphatic carbon atoms, such as dimethyl azobisisobutyrate and azobisisobutyronitrile, are particularly preferred. The catalysts and initiators are preferably employed in amounts varying from about .1% to about 5% by weight of the monomer, and more preferably from 1% to 3% by weight of the monomer.

If the monomers are to be polymerized by the use of chemically active radiations, one may also employ photosensitizers, such as lead tetraethyl, diacetyl, phenylglyoxal, glyoxal, mercurydimethyl, aliphatic azo compounds, vat dyes, and the like. The aliphatic azo compounds are particularly preferred. In most cases, the photosensitizers may be employed in amounts varying from about 0.01% to 5% by weight of monomer.

Various types of other additives may be added to the polymerization mixture before or at any time during the polymerization reaction provided the additives do not interfere with the stability of the polymer. These additives include emulsifying agents, emulsifying stabilizers, such as polysaccharides, gum arabic, soluble starch, dextrine, as well as lubricants, pigments, dyes, plasticizers, and the like. The nature and amount of the additives will depend upon the mixture of monomers selected and the intended use of the final product.

The polymerization processes may be conducted in a batchwise, semi-continuous or continuous manner according to any of the known procedures. If copolymers are to be produced, the procedures may be those employed for the preparation of heterogeneous-type copolymers or those used for the preparation of homogeneous copolymers.

In the operation of the process of the invention with the above polymerization systems, the above-described stabilizing compounds are added to the desired medium containing the monomer, catalyst, etc. and then the medium exposed to the desired temperature and/or chemically active radiation. The stabilizing compound may be added all at one time at the beginning of the process or it may be added in increments throughout the reaction as long as there is sufficient amount present to effect the desired stabilization. In batch operations, the stabilizing compound is preferably all added at the beginning of the process, while in continuous operations, the stabilizing compound may be added at the beginning and then continuously added to the reaction mixture along with the monomer, water, catalyst, etc.

After the polymer has been formed, it may be recovered from the reaction mixture by any procedure conventionally employed for that type of polymerization method, such as by filtration, coagulation with salts, alcohols, coagulation by freezing, precipitation, evaporation and the like.

The process of the invention is preferably accomplished in an aqueous system and preferably an aqueous emulsion or suspension system, wherein the above-described stabilizing compound is added in amounts indicated above to the aqueous medium containing the monomer or monomers, free radical yielding polymerization catalyst, an emulsifying or suspending agent, and the mixture then heated to the desired polymerization temperature. Emulsifying agents used in the preparation of the aqueous emulsions may be any of the known ionic or non-ionic type emulsifying materials, such as soaps like sodium or potassium myristate, laurate, palmitate, oleate, stearate, rosinate, or hydroabietate; or alkali metal alkyl or alkenyl sulfates or sulfonates, including sodium or potassium lauryl sulfate, cetyl sulfate, oleyl sulfonate, stearyl sulfonate, sulfonated Turkey red oil, sulfonated mineral oils, sodium alkyl naphthalene sulfonate, sodium arylalkyl polyether sulfonate, etc., as well as ammonium salts of such sulfates or sulfonates, cetyl trimethyl ammonium bromide, cetyl pyridinium bromide, sorbitol monolaurate, sorbitol mono-oleate, polyoxyalkylene ethers of partial esters of sorbitol with lauric, palmitic, stearic or oleic acid. Particularly preferred are the salts of alkyl sulfonates wherein the alkyl group contains from 10 to 20 carbon atoms. The emulsifying agents are preferably employed in amounts varying from .01% to 5% by weight of monomer.

Suspending agents used in the suspension type polymerization may be exemplified by finely-divided clay, talc, barium sulfate, methyl cellulose, polyfluoroalkanoic acids, such as dodecafluoroheptanoic acid, salts of these acids with saturated alkylamines, and the like. These suspending agents are preferably employed in amounts varying from .01% to 4% by weight.

The catalysts used in the aqueous system may be any of the above-described free radical yielding catalysts, but are preferably the azo compounds having an azo group linked by both valencies to aliphatic and preferably tertiary carbon atoms, such as dimethyl azobisisobutyrate and azobisisobutyronitrile. These catalysts are preferably employed in amounts varying from .1% to 5% by weight of monomer.

A typical emulsion polymerization recipe would consist of about 200 to 400 parts of water, 100 parts of liquefied monomers, .1 to 2 parts of emulsifying agent, .1 to 5 parts of water-soluble polymerization catalyst, and .001 mol to 8 mol per 100 mol of monomer of the desired stabilizing compound, such as cumene, cymene, fluorene, and the like.

Typical suspension polymerization recipe would consist of about 100 parts of liquid monomer, 300 to 500 parts of water, .1 to 4 parts of a water-soluble catalyst or monomer-soluble catalyst, such as lauroyl peroxide, and a small amount of a suspending agent.

Temperatures employed in the aqueous polymerization systems will preferably vary from about 25° C. to 90° C., and more preferably from about 50° C. to 70° C. Pressures employed should be sufficient to keep the vinyl chloride and other monomers in the liquid state. Preferred pressures vary from about 4 to 9 atmospheres, and more preferably from about 5 to 8 atmospheres.

The polymers may be removed from the aqueous system by any of the known methods such as by filtration, coagulation by freezing, addition of salts, solvents, and the like.

The process of the invention may be used to prepare homopolymers of vinyl chloride or copolymers of vinyl chloride with one or more other ethylenically unsaturated monomers and particularly those containing a single $CH_2=C=$ group, such as, for example, vinyl acetate, ethyl acrylate, methyl acrylate, butyl acrylate, diethyl maleate, octyl acrylate, acrylonitrile, methacrylonitrile, vinyl benzoate, vinyl valerate, vinyl butyl phthalate, allyl butyl phthalate, styrene, alpha-methyl styrene, vinyl pyridine, cyclohexyl 3-butenoate, vinylidene chloride, vinylidene bromide, vinyl ethyl ether, vinyl butyl ether, vinyl ethyl ketone, vinyl hexyl ketone, and the like, and mixtures thereof. In preparing the copolymers, the amount of the dissimilar monomer preferably varies from about .1% to 45% by weight of the total monomer, and more preferably from about .5% to 25% by weight of the total monomer.

Preferred monomers to be copolymerized with the vinyl chloride include vinylidene chloride, styrene, alpha-methylstyrene, acrylonitrile, methacrylonitrile, vinyl ethyl ketone, and the ethylenically unsaturated aliphatic acid esters containing no more than 12 carbon atoms, and especially the esters of the ethylenically unsaturated alcohols and the saturated aliphatic monocarboxylic acids, such as vinyl acetate, allyl acetate, vinyl propionate, and the like.

As indicated above, the homopolymers and copolymers produced by the process of the invention have excellent stability to heat and light and can be used directly in their intended applications, such as in the formation of coatings, fibers, filaments and shaped articles without having to be mixed or combined with known stabilizing components, such as metallic salts, and the like. The polymers are particularly suitable for use in preparing films and coatings which are to be exposed to the atmosphere for considerable periods of time.

To illustrate the manner in which the invention may be carried out, the following examples are given. It is to be understood, however, that the examples are for the purpose of illustration and the invention is not to be regarded as limited to any of the specific materials or conditions recited therein.

*Example I*

Batches of liquid vinyl chloride were polymerized at 30° C. in the presence of 1 mol percent of azobisisobutyronitrile and varying quantities of different stabilizing compounds as indicated below. After polymerization was terminated, the products were extracted with ether to remove azobisisobutyronitrile, and subsequently dissolved in diphenyl oxide to solutions of 2% concentration. The solutions were heated to 182° C. while a slow stream of nitrogen was passed through. The content of hydrogen chloride in the nitrogen which was passed through such a solution was then determined. From this content it was possible to calculate the rate of decomposition of the polymer present in the solution.

| Stabilizing Compound | Quantity, mol percent cal. on monomer | Rate of decomposition mol HCl per mol of polymer per hour |
| --- | --- | --- |
| None | | 2.24 |
| Cumene | 1.3 | 1.85 |
| Do | 3.7 | 1.00 |
| Do | 5.3 | 0.93 |
| Triphenyl methane | 0.11 | 1.64 |
| Do | 0.50 | 1.35 |
| Do | 1.00 | 1.22 |
| Fluorene | 0.58 | 0.91 |
| Do | 1.00 | 0.85 |
| Dihydroanthracene | 0.011 | 1.10 |
| Do | 0.16 | 0.69 |
| Benzyl chloride | 1.9 | 1.60 |
| Do | 3.1 | 1.05 |
| Do | 5.5 | 1.05 |

Similar results are obtained by using a mixture of 90 parts of vinyl chloride and 10 parts of vinyl acetate for the vinyl chloride in the above-described process.

*Example II*

Vinyl chloride was polymerized in an emulsion system having the following composition:

100 parts by weight of vinyl chloride
5 parts by weight of sodium mersolate [1]
0.4 part by weight of potassium persulphate
0.4 part by weight of sodium bicarbonate
294.2 parts by weight of water

[1] (Sodium mersolate is a product which is obtained by reacting saturated aliphatic hydrocarbons having 10 to 20 carbon atoms with sulphur dioxide and chlorine, followed by alkaline saponification of the sulphochlorides formed.)

and various amounts of derivative as shown in the table below.

Polymerization was carried out at 45° C. in glass tubes which had been sealed by melting, each containing about 110 grams of emulsion. The tubes were placed horizontally in a holder which rotated around a horizontal shaft at a rate of 13 r.p.m.

After 20 hours, the tubes were opened and their contents coagulated with ethanol. The coagulate was washed out, first with ethanol, then with water, then with a solution of 0.2% concentration of sodium bicarbonate in water, and finally dried.

The stability of the products was determined as in Example I.

| Stabilizing Compound | Quantity, percent by wt. cal. on monomer | Rate of decomposition micro mol. HCl per gram of polymer per hour |
| --- | --- | --- |
| None | | 65 |
| Cumene | 1 | 57 |
| Do | 5 | 40 |
| Do | 10 | 33 |
| Dihydroanthracene | 0.02 | 44 |
| | 2 | 55 |
| Benzyl chloride | | |
| Do | 5 | 48 |
| Do | 10 | 44 |

*Example III*

90 parts of vinyl chloride and 10 parts of vinylidene chloride are polymerized in an aqueous emulsion in the presence of azobisisobutyronitrile as shown in Example II using 5.3 mol percent of each of the following stabilizing compounds: cymene, phenyl-2-butane, diphenylmethane, dichloromethylbenzene and hydrogenated naphthalene. In each case, the resulting copolymer has improved heat and light stability.

I claim as my invention:

1. A process for preparing polymers of vinyl chloride which have improved stability to heat which comprises adding to an aqueous emulsion containing monomeric vinyl chloride and a free radical polymerization catalyst from .005 mol to 5 mol per 100 mol of vinyl chloride of cumene and then heating at a temperature of 25° C. to 90° C.

2. A process for preparing polymers of vinyl chloride having improved stability to heat which comprises adding to an aqueous emulsion containing monomeric vinyl chloride and a free radical polymerization catalyst, from .005 mol to 8 mol per 100 mol of vinyl chloride of a stabilizing compound of the group consisting of cumene, benzyl chloride and triphenylmethane, and then heating the mixture to a polymerizing temperature.

3. A process as in claim 2 wherein the stabilizing compound is triphenylmethane.

4. A process as in claim 2 wherein the polymerization catalyst is an aliphatic azo polymerization catalyst.

5. A process for preparing copolymers of vinyl chloride and a monomer containing a single $CH_2=C=$ which comprises adding to an aqueous emulsion containing the vinyl chloride monomer and dissimilar monomer containing the $CH_2=C=$ group and a free radical yielding catalyst from .005 to 5 mols per 100 mol of monomer of a stabilizing compound of the group consisting of cumene, benzyl chloride and triphenylmethane, and then heating the mixture to a temperature from 25° C. to 90° C. to effect polymerization of the monomers.

References Cited in the file of this patent

UNITED STATES PATENTS

| | | |
|---|---|---|
| 2,272,827 | Barnes | Feb. 10, 1942 |
| 2,310,971 | Lincoln et al. | Feb. 16, 1943 |
| 2,387,571 | Fikentscher et al. | Oct. 23, 1945 |
| 2,471,959 | Hunt | May 31, 1949 |
| 2,564,291 | Wolf | Aug. 14, 1951 |
| 2,569,447 | Borglin et al. | Oct. 2, 1951 |
| 2,584,773 | Reynolds et al. | Feb. 5, 1952 |
| 2,625,521 | Fischer et al. | Jan. 13, 1953 |
| 2,625,568 | Young et al. | Jan. 13, 1953 |
| 2,640,044 | Stamatoff | May 26, 1953 |
| 2,730,436 | Young et al. | Jan. 10, 1956 |

FOREIGN PATENTS

| | | |
|---|---|---|
| 652,730 | Great Britain | May 2, 1951 |
| 790,669 | France | Sept. 9, 1935 |

OTHER REFERENCES

The Van Nostrand Chemist's Dictionary, 1953, page 44, item "aryl."